June 30, 1936. H. BAEHR 2,045,747
REMOVAL OF WEAK ACIDS AND AMMONIA FROM GASES
Filed June 30, 1933
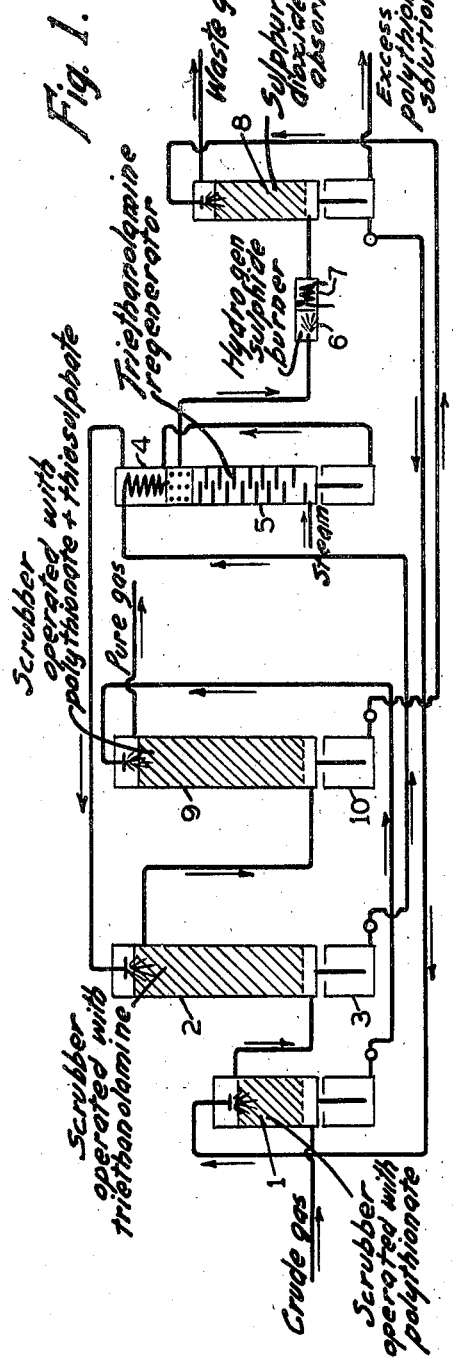
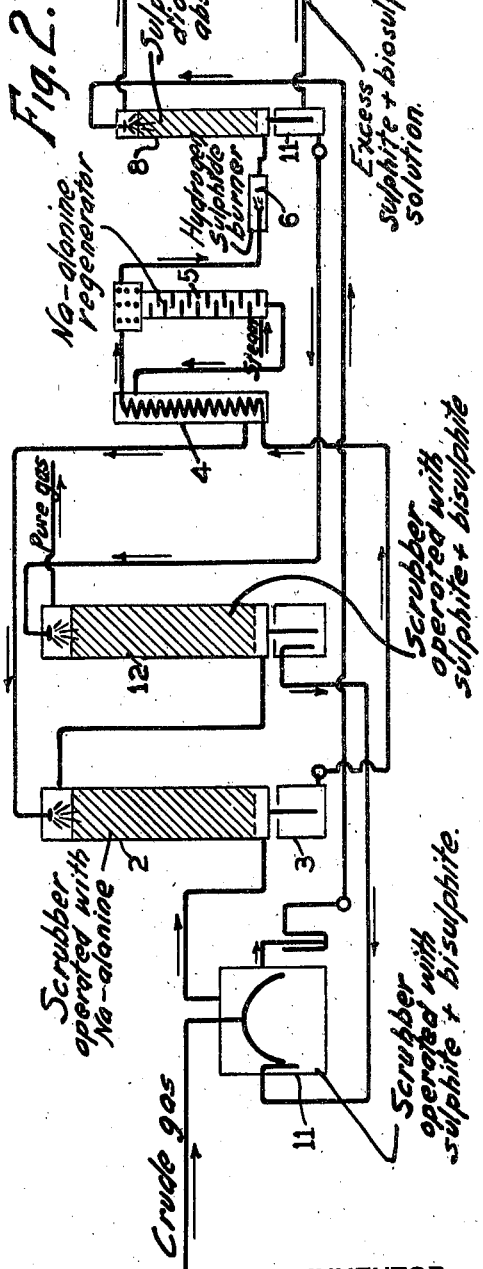
INVENTOR
HANS BAEHR
BY
ATTORNEYS Patented June 30, 1936

2,045,747

UNITED STATES PATENT OFFICE 2,045,747

REMOVAL OF WEAK ACIDS AND AMMONIA FROM GASES

Hans Baehr, Leuna, Germany, assignor to I. G. Farbenindustrie Aktiengesellschaft, Frankfort-on-the-Main, Germany Application June 30, 1933, Serial No. 678,357
In Germany July 5, 1932

1 Claim. (Cl. 23—3)

The present invention relates to the removal of weak acids and ammonia from gases, more particularly with the recovery of ammonium sulphite or ammonium thiosulphate or of ammonium sulphate and sulphur.

It has already been proposed to remove hydrogen sulphide and ammonia from gases by absorption with ammonium sulphite-bisulphite liquors or ammonium polythionate liquors, the exhausted scrubbing solutions being worked up into ammonium sulphate and sulphur by treatment with sulphur dioxide and boiling. When employing this method it is important that the proportions of ammonia and hydrogen sulphide in the crude gas are the same in which the two gas constituents occur in the final products. If a corresponding adjustment of the proportions of the two gas constituents is not maintained, the excess of the one constituent remains in the gas; this necessitates an expensive afterpurification. A further drawback of the said process consists in the fact that the cyanogen compounds react with the polythionate compounds with the formation of ammonium thiocyanate which can only be difficultly removed from the ammonium sulphate liquors, so that the resulting salt is liable to have a red color by the formation of iron thiocyanate. Furthermore, by the said process it is generally speaking impossible to remove carbon dioxide.

I have now found that the said drawbacks are obviated by removing the weakly acid constituents, such as carbon dioxide, hydrogen sulphide and cyanogen compounds from the gas by means of a scrubbing process in which the weakly acid constituents are recovered from the scrubbing medium as such, the hydrogen sulphide, recovered by expelling it from the scrubbing liquid, then being brought into reaction in a suitable manner with the ammonia.

The gases are accordingly first scrubbed with a scrubbing liquid so that the weakly acid constituents are absorbed, the hydrogen sulphide which escapes (together with carbon dioxide and hydrocyanic acid) when the enriched scrubbing liquid is heated is then burned to form sulphur dioxide and the latter employed for reaction with ammonia, ammonium sulphite or ammonium thiosulphate in the manner already known for the so-called polythionate process. For the purpose of scrubbing out hydrogen sulphide, any scrubbing liquid which absorbs hydrogen sulphide at ordinary temperature and yields it up again at elevated temperature may be employed. Scrubbing liquids which have this action are for example amines or aqueous solutions of amines, especially hydroxyalkylamines such as triethanol amine, diethanol amine and butanol amine, alkali metal and alkali earth metal salts of amino acids, as for example of glycocoll, alanine, or alkaline solutions of phenols, or also solutions of alkylol amines or alkyl-alkylol-amines in hydrocarbon liquids such as tar oils, paraffin oils and the like. The absorption of the hydrogen sulphide may take place in the presence of the ammonia or after previous absorption of the same by means of faintly acid ammonium sulphite or polythionate solutions. The hydrogen sulphide absorbed by the scrubbing liquid is expelled therefrom by heating and burned with air or oxygen. The resulting sulphur dioxide then serves for the conversion of ammonium sulphite liquors into ammonium sulphite-bisulphite liquors or of ammonium thiosulphate liquors into ammonium polythionate liquors in the usual manner. The ammonium sulphite-bisulphite or ammonium polythionate liquors thus obtained are then used for scrubbing out the ammonia from the gas either before or after the removal of the weakly acid constituents. When the removal of the ammonia is effected after the scrubbing out of the hydrogen sulphide, any small amounts of hydrogen sulphide not absorbed by the scrubbing liquor and still present in the gas are also absorbed by this treatment so that simultaneously a final purification of the gas is attained.

In order to work up the liquors containing ammonium sulphite or ammonium thiosulphate obtained by purifying the gases from ammonia into ammonium sulphate and sulphur, the ammonium sulphite is boiled with sulphur or substances which split off sulphur and thus converted into ammonium thiosulphate, the latter is treated with sulphur dioxide (which may likewise be obtained by burning hydrogen sulphide) and thus converted into ammonium polythionate which when heated decomposes to form ammonium sulphate and sulphur.

By reason of the fact that the absorption of the hydrogen sulphide is effected by a special scrubbing process, the proportion of ammonia simultaneously present in the gas has no effect on the degree of purification of the gas, contrasted with the usual polythionate process. The process according to the present invention therefore has the great advantage over all processes hitherto known that the ratio of ammonia to hydrogen sulphide in the gas plays no part in the purification thereof so that gases having the most varied contents of ammonia and hydrogen sulphide may be directly employed. Gases may even be employed in which, besides hydrogen sulphide, there is little or no ammonia present. In this case ammonia derived from other sources may be employed. If, on the other hand, in addition to hydrogen sulphide there is an excess of ammonia present in the gas, the excess of ammonia may be removed by absorption in acids or water. Similarly any deficiency of sulphur dioxide may be made good by burning sulphur.

The following examples, given with reference to the accompanying drawing which diagrammatically illustrates arrangements of apparatus suitable for carrying out the process according to this invention, will further illustrate the nature of the invention, but the invention is restricted neither to these examples nor to the arrangements shown in the drawing. In Figure 2 of the drawing, parts corresponding to those indicated in Figure 1 are indicated by the same reference numbers.

Example 1

Referring to Figure 1, coke oven gas containing 8 grams of ammonia, 12 grams of hydrogen sulphide, 1.2 grams of cyanogen and cyanogen compounds and 35 grams of carbon dioxide per cubic meter is trickled, after cooling to about 25° C., in a scrubbing tower 1 with an acid ammonium polythionate liquor freshly regenerated by the leading in of sulphur dioxide the ammonia thus being wholly absorbed while the hydrogen sulphide is only absorbed to a slight extent. The gas is then trickled with a 50 per cent aqueous triethanol amine solution in a scrubbing tower 2, the hydrogen sulphide and the cyanogen compounds being thus wholly, and the carbon dioxide partly, removed from the gas. The exhausted triethanol amine solution collects in a container 3 and is preheated to about 80° C. in a heat exchanger 4 by hot regenerated liquor; the carbon dioxide, hydrogen sulphide and cyanogen are expelled from the gas by blowing steam into a column 5. The hot triethanol amine solution gives up its heat to the used solution in the heat exchanger 4 and then passes back into the scrubbing tower 2. The hydrogen sulphide expelled is burned with air in a furnace 6 and the resulting sulphur dioxide, after cooling in a cooler 7 is absorbed by ammonium thiosulphate solution in an absorption tower 8.

The coke oven gas, after its treatment with the triethanol amine solution in the scrubbing tower 2, still contains small amounts of hydrogen sulphide and in order to effect the final purification is trickled in a scrubbing tower 9 with the faintly ammoniacal ammonium thiosulphate-ammonium polythionate solution flowing from the scrubbing tower 1. The ammonium polythionate solution absorbs the residual amount of hydrogen sulphide with the formation of ammonium thiosulphate; the solution collects in a container 10 from which it is pumped into an absorption tower 8 for regeneration with sulphur dioxide. The regenerated ammonium thiosulphate solution is in part pumped into the scrubbing tower 1 for scrubbing out ammonia and the excess is boiled in the usual manner to form ammonium sulphate and sulphur.

Solutions of the polythionates of alkali or heavy metals may be used instead of the ammonium polythionate solution.

Example 2

Referring to Figure 2, coke oven gas having the composition specified in Example 1 is treated in a preliminary scrubber 1 with a solution of ammonium sulphite containing small amounts of ammonium bisulphite. The ammonia is thus removed fairly completely from the gas. The gas is then scrubbed in a scrubber 2 with an approximately 30 per cent solution of sodium alanine, the hydrogen sulphide and the cyanogen compounds being thus almost completely, and the carbon dioxide about half, absorbed by the washing liquid. The used sodium alanine solution is forced from the collecting container 3 through a heat exchanger 4 into a steam heater from which it then passes into a column apparatus 5 arranged below said steam heater. The steam expels the acid constituents from the scrubbing liquor trickling down in counter-current through the single partitions of the column. The purified solution passes through the heat exchanger 4 and then to the top of the scrubber 2. The hydrogen sulphide is burned in a furnace 6 to form sulphur dioxide which is absorbed in an absorption tower 8 by the ammonium sulphite solution coming from the preliminary scrubber 1 with the formation of an ammonium sulphite-ammonium bisulphite solution. This latter solution collects in a container 11 and is forced to a scrubbing tower 12 for the final purification of the gas. In the said scrubbing tower 12, the residual amounts of hydrogen sulphide and ammonia are removed from the gas so that the gas leaving the said scrubbing tower is completely purified.

A part of the ammonium sulphite solution which is not required for the final purification of the gas in the scrubbing tower 12 is converted by boiling with sulphur into ammonium thiosulphate and converted into ammonium polysulphate by leading in sulphur dioxide. By boiling the ammonium polythionate solution, ammonium sulphate and sulphur are formed. According to the specified composition of the gas with 8 grams of ammonia and 12 grams of hydrogen sulphide per cubic meter, only 8 grams of hydrogen sulphide per cubic meter are required for combination with ammonia to form ammonium sulphate. Consequently there is an excess of 4 grams of hydrogen sulphide in each cubic meter of the gas and this is recovered as elementary sulphur.

What I claim is:—

The process for the removal of hydrogen sulfide and ammonia from a gas containing the same, which comprises scrubbing said gas with an aqueous solution of ammonium polythionate, thereby removing ammonia from gas, passing the resulting gas into contact with a substance capable of absorbing hydrogen sulfide and from which hydrogen sulfide can be recovered as such, thereby removing the major portion of the hydrogen sulfide, contacting the resulting gas with the solution of ammonia resulting from the first scrubbing in order to remove the last traces of hydrogen sulfide therefrom, leaving a pure gas, recovering the hydrogen sulfide from the solution of hydrogen sulfide resulting from the second scrubbing, burning the hydrogen sulfide to sulfur dioxide, reacting the sulfur dioxide so formed with the solution obtained from the third scrubbing step to regenerate the same, and recycling said regenerated polythionate solution to the first scrubbing step.

HANS BAEHR.